United States Patent [19]

Rook

[11] Patent Number: 5,631,444
[45] Date of Patent: May 20, 1997

[54] CABLE COUPLING FOR GROUNDING AN INTERNAL LIGHTNING PROTECTOR DEVICE

[75] Inventor: Peter Rook, Harsefeld, Germany

[73] Assignee: Daimler-Benz Aerospace Airbus GmbH, Hamburg, Germany

[21] Appl. No.: 421,362

[22] Filed: Apr. 12, 1995

Related U.S. Application Data

[63] Continuation-in-part of Ser. No. 56,254, Apr. 30, 1993, Pat. No. 5,418,330.

[30] Foreign Application Priority Data

May 1, 1992 [DE] Germany .................... 42 14 508.2

[51] Int. Cl.$^6$ .................................................. H02G 15/08
[52] U.S. Cl. ................................................ 174/78; 439/98
[58] Field of Search ............................ 174/78, 75 D, 174/88 R; 439/96, 98, 610, 578, 579

[56] References Cited

U.S. PATENT DOCUMENTS

| | | | |
|---|---|---|---|
| 1,941,905 | 1/1934 | Mair | 247/1 |
| 3,141,924 | 7/1964 | Forney, Jr. | 174/75 |
| 3,280,246 | 10/1966 | Lawson et al. | 174/88 |
| 3,307,137 | 2/1967 | Tordoff et al. | 439/610 |
| 4,080,024 | 3/1978 | Kroon | 339/14 |
| 4,243,290 | 1/1981 | Williams | 439/610 |
| 4,257,658 | 3/1981 | Hammond et al. | 339/14 |
| 4,830,629 | 5/1989 | Yoshimura | 439/610 |
| 4,838,808 | 6/1989 | Fijiura | 439/357 |

FOREIGN PATENT DOCUMENTS

| | | |
|---|---|---|
| 0328234 | 8/1989 | European Pat. Off. |
| 1118849 | 12/1961 | Germany ..... 439/610 |
| 1515421 | 6/1969 | Germany . |
| 1515404 | 12/1969 | Germany . |
| 1765723 | 8/1971 | Germany . |
| 3308492 | 8/1985 | Germany . |
| 389719 | 7/1965 | Switzerland . |
| 401198 | 4/1966 | Switzerland . |

Primary Examiner—Hyung S. Sough
Assistant Examiner—Marc D. Machtinger
Attorney, Agent, or Firm—W. G. Fasse; W. F. Fasse

[57] ABSTRACT

An effective grounding of electrical equipment, electrical cables, housings, and the like, is accomplished by grounding lugs that are initially formed as an integral part, for example, of a grounding sleeve of electrically conducting material that surrounds a protective cable casing of electrically conducting material in a crimping manner. The lugs are only bent out of the sleeve when needed. A grounding conductor is then secured to the lug. The grounding lugs may be incorporated in all systems that are provided for protection against surge currents or excessive voltages produced by a thunderstorm, especially in a vehicle or a craft, e.g. an aircraft. A cable connector includes a hollow support body that reaches with an inner end into the grounding sleeve to provide a backing for holding an end of the cable casing clamped between the grounding sleeve and the inner end of the support body. The outer end of the support body carries a coupling nut. A protective hose of electrically insulating material is also held in place by clamping one end thereof between the inner end of the support body and the cable casing, whereby the grounding sleeve holds the casing and the hose in place.

14 Claims, 6 Drawing Sheets

CABLE COUPLING FOR GROUNDING AN INTERNAL LIGHTNING PROTECTOR DEVICE

CROSS-REFERENCE TO RELATED APPLICATION

This application is a continuation-in-part application of my application U.S. Ser. No. 08/056,254, filed Apr. 30, 1993, now U.S. Pat. No. 5,418,330 (Rook).

FIELD OF THE INVENTION

Cable couplings for interior electric components, for example in vehicles, watercraft, and aircraft require protection against excess currents caused by electrical disturbances, such as lightning. For this purpose these cable connectors or couplings require an efficient grounding.

BACKGROUND INFORMATION

It is known that exterior lightning protection devices alone are not sufficient to prevent damage to interior electrical equipment when lightning strikes. Excess currents may still be generated in electronic and electrical devices inside a building, vehicle, or craft such as an aircraft. Thus, steps must be taken against the effects of currents caused by lightning and against the resulting magnetic and electrical fields generated on interior metal installations and electrical equipment. The most important step in this connection is an efficient and rapid potential equalization by grounding to avoid thunderstorm electrical damages. Such equalization is accomplished by an effective electrical grounding connection of the endangered equipment to grounded metallic pipes or other grounding devices, if necessary through spark gap arresters. Such grounding connections must permit a rapid connection and disconnection of two couplings with each other and at least one of the couplings with a grounding conductor while assuring an effective equalization of any excess electrical potential caused by lightning.

Several versions of such grounding connectors are known for realizing the grounding of lightning protection systems. Normally, one end of a grounding conductor is secured to a metal cable clamp which in turn is connected to the component to be protected while the other end of the grounding conductor is secured to a grounded pipe system or the like. Such cable clamps have also been secured to cable end connectors and cable couplings, including an end housing that itself is connected to an electrically conducting, protective cable envelope or cable casing, such as a wire mesh cable envelope. The use of cable clamps for these purposes is cumbersome, at least in those instances where it is not possible to place the cable clamp around the cable end housing or around a sleeve extending from the end housing due to lack of accessibility. Even if the grounding conductor can be secured to the cable clamp by a screw connection, the placement of the cable clamp itself is cumbersome. Thus, efforts have been made to provide divided cable clamps that can be placed around a cable even if there is no free cable end. However, such divided cable clamps still require a connector and a sleeve for securing the divided cable clamp.

In addition to the mechanical difficulties of properly placing a cable clamp or even a divided cable clamp, the conventional devices have the disadvantage that transition resistances occur between the cable clamp and the component to which the cable clamp is secured. Further, corrosion tends to start between the clamp and the sleeve or end housing to which the clamp is secured. Besides, the clamp itself requires an additional expense for making these separate clamps and the combined weight of a multitude of clamps can be substantial, thereby adding to the weight of the system.

German Patent Publication 118,849 (Dunkel), published on Dec. 7, 1961, discloses a cable coupling comprising a male cable terminal and a female cable terminal. The female terminal is provided with a grounding sleeve also referred to as screen or shielding sleeve. One end of the grounding sleeve is connected with a coupling sleeve. The other end of the grounding or shielding sleeve is provided with contact tongues that are circumferentially distributed around the grounding or shielding sleeve. The contact tongues are preferably spring contacts which bear against the screen casing of the high frequency cable. Each contact tongue contributes to a transition resistance established between the respective contact tongue and the surface of the screen or wire mesh cable casing. Further, the tongues are subject to contamination and corrosion, which contribute to increasing the transition resistance over time, whereby the desired grounding capability deteriorates. Dunkel does not make any suggestion to constructing a coupling sleeve of a cable terminal and a grounding sleeve as a single-piece electrical conductor.

OBJECTS OF THE INVENTION

In view of the above it is the aim of the invention to achieve the following objects singly or in combination:

to avoid the use of separate cable clamps altogether by integrating a grounding connector or sleeve directly into a cable end connector or coupling;

to assure an efficient grounding of an electrically conducting cable casing while minimizing transition resistances;

to reduce the weight of such grounding connections while simultaneously minimizing corrosion of the grounding components;

to provide either a screwed, or a form-locking location fit, or a plug-in connection between a grounding conductor and an electrically conducting cable casing;

to protect the insulation of electrically insulated individual electrical conductor strands inside the cable casing in such a way that frictional abrasions or chafing that may be caused by vibrations, are avoided to thereby prevent short circuiting of these strands with the cable casing such as a wire mesh grounding casing of the cable;

to construct the cable terminal or coupling with an interior support body so that any crimping forces applied to an external coupling sleeve that is simultaneously a grounding sleeve can be safely applied without damaging any components of the cable and coupling;

to provide an electrically conducting grounding path that has a minimum of transition resistances between the wire mesh cable casing and a grounding sleeve adapted for connection to a grounding conductor such as a grounding bus or rail; and to avoid damage to the wire mesh cable casing when the latter is electrically contacted with the grounding sleeve so that the wire mesh cable casing and the grounding sleeve can form together an efficiently grounded Faraday cage.

SUMMARY OF THE INVENTION

According to the invention there is provided a cable and cable connector combination comprising an electrical cable, an electrically conducting cable casing enclosing said electrical cable, a cable connector, a device for grounding said cable casing for protecting said combination against lightning, said grounding device comprising an electrically conducting grounding sleeve electrically contacting said cable casing and said cable connector for grounding both, and at least one grounding lug forming an integral part of said electrically conducting grounding sleeve so that said electrically conducting grounding sleeve and said grounding lug form together a one-piece electrical conductor, said grounding lug comprising means for electrically connecting a grounding conductor to said cable casing through said one-piece electrical conductor, and wherein said cable connector comprises a hollow support body of electrically conducting material arranged inside said electrically conducting grounding sleeve, said support body having a coupling end and an internal end, said internal end being surrounded by said electrically conducting cable casing which in turn is surrounded by said electrically conducting grounding sleeve to clamp said electrically conducting cable casing between said support body and said electrically conducting grounding sleeve.

The grounding lug does not provide a transition resistance between the lug and the grounding sleeve because the lug is an integral part of the grounding sleeve which is thus directly connectable to a grounding conductor through the grounding lug. Such connection may, for example, be accomplished by a screw connection or by a plug-in connection, preferably having a location fit. The grounding lug is provided with a through hole for the screw connection or with a threaded hole. For the plug-in connection the lug may be shaped as a female or a male plug member that cooperates with a respective plug member of a grounding conductor.

In a preferred embodiment, the electrically conducting grounding sleeve is electrically connected to the terminal end housing at one end of the sleeve while the other sleeve end has a flared collar as a result of crimping of the grounding sleeve onto the inner end of the support body. The flared collar preferably forms an angle with the longitudinal cable axis and is formed if the crimping tool is axially shorter by the axial length of the collar, than the grounding sleeve.

In another preferred embodiment, one or two lugs are punched out of the grounding sleeve, except along one side, so that initially the lugs conform to the cylindrical configuration of the sleeve. Only when the lugs are to be connected to a grounding conductor will the lugs be bent out of the grounding sleeve. Again, the connection to the grounding conductor may be by a screwed connec tion or by a plug-in connection.

It is an advantage of the invention that the grounding lug forms an integral part of the conducting grounding sleeve and remains integrally connected to the sleeve to avoid transition resistances as well as corrosion caused by metal surfaces contacting each other.

In a preferred embodiment the inner end of the electrically conducting hollow support body and the grounding sleeve that doubles as a crimping bushing, form together a first ring space in which the free end of the electrically conducting cable casing is held in place by a crimping action. In the embodiment with a protective electrically insulating hose, the cable casing and the inner end of the hollow support body form a further ring space in which the free end of the hose is held also by the crimping action of the grounding sleeve. The two ring spaces are spaced axially from each other by a spacing S formed between two radially extending, axially facing shoulders against which respective free ends of the cable casing and of the hose bear.

In the embodiment in which the inner hollow body carries rotatably a coupling nut also of electrically conducting material, a continuous current grounding path is established from the coupling nut through the hollow support body, through the grounding sleeve, and through the cable casing to a ground conductor, whereby the structure functions as a shielding Faraday cage which positively shields out adverse influences caused by lightning.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
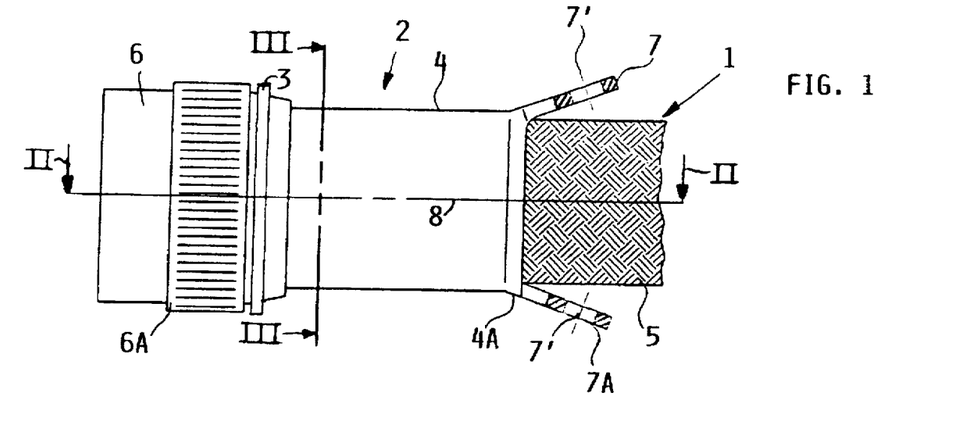
FIG. 1 is a side view of a first embodiment of a cable end combined with a cable connector and a grounding device according to the invention with two grounding lugs for connection to a grounding conductor.
Figure 2:
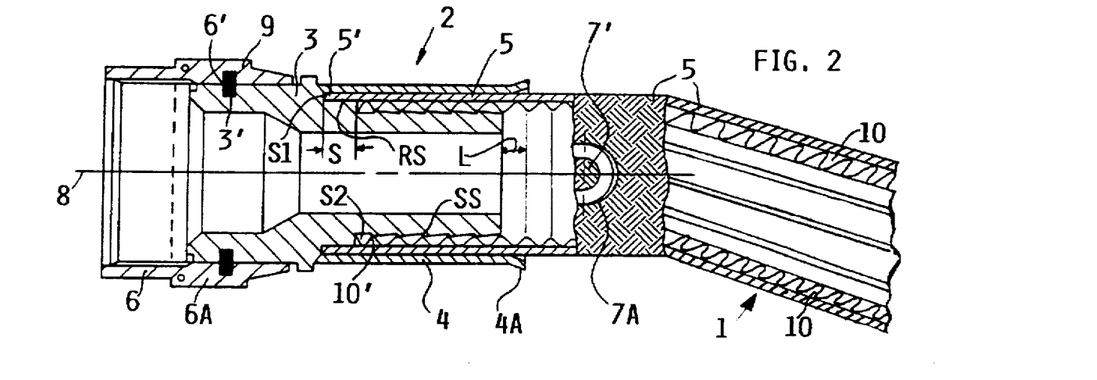
FIG. 2 is a sectional view along section line II—II in FIG. 1 illustrating a portion of cable end and a hollow support body as part of the cable connector secured to the cable end.
Figure 3:
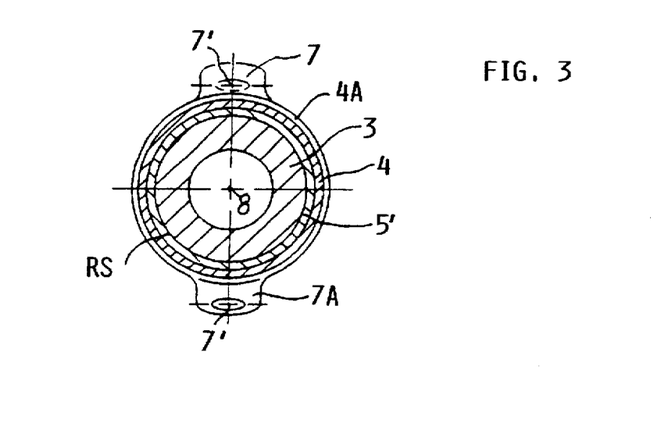
FIG. 3 is a view along section line III—III in FIG. 1.

FIGS. 1, 2, and 3 show a first embodiment of the invention. A cable 1 is connected to a cable connector 2 having an inner hollow support body 3 made of an electrically conducting material and a grounding sleeve 4 also made of an electrically conducting material. The grounding sleeve 4 is crimped onto an electrically conducting cable casing 5, such as a wire mesh hose surrounding the cable 1. The left-hand end of the preferably cylindrical grounding sleeve 4 is connected to or forms an integral part of the support body 3 as best seen in FIG. 2. Preferably, an electrically conducting coupling nut 6 is rotatably to the left-hand coupling end of the support body 3. The coupling nut 6 has a radially inwardly facing ring groove 6' and a grip portion 6A. The inner hollow support body 3 has a radially outwardly facing ring groove 3'. A spring ring 9 of electrically conducting material locks the coupling nut 6 to the support body 3 against relative axial displacement.

However, the spring ring 9 permits relative rotation between the coupling nut 6 and the support body 3. The spring ring 9 assures a good electrical contact between the support body 3 and the coupling nut 6.

Figure 16:
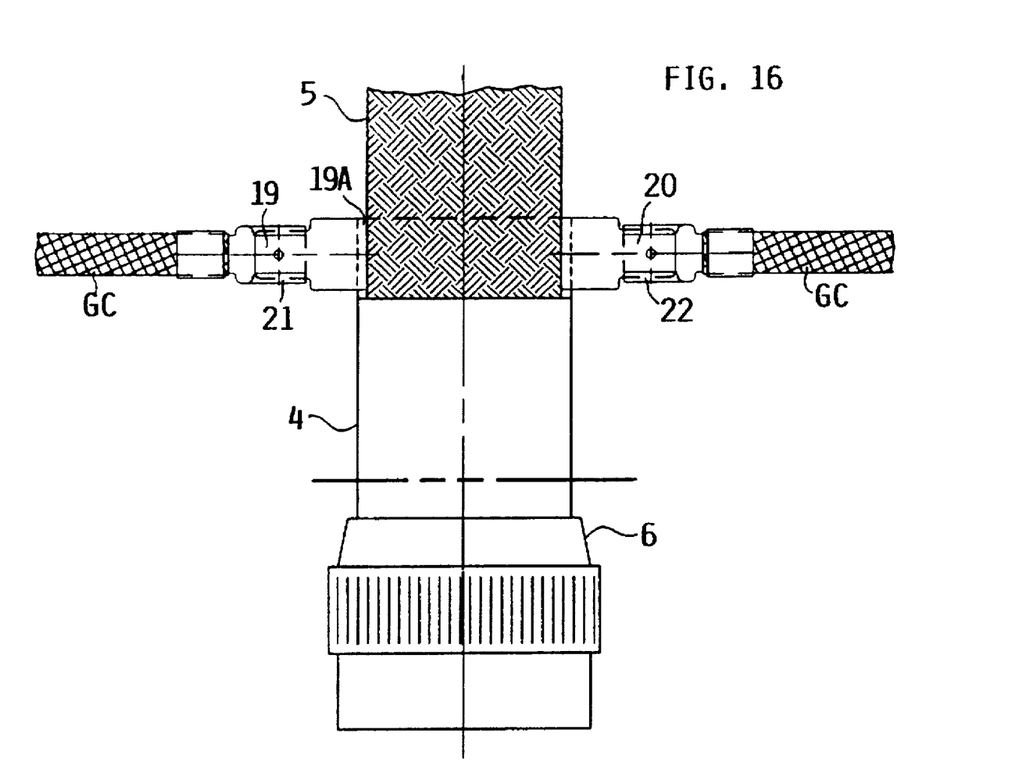
FIG. 16 shows a view similar to that of FIG. 1, but illustrating two radially extending plug-in connections for two separate grounding cables.
Figure 17:
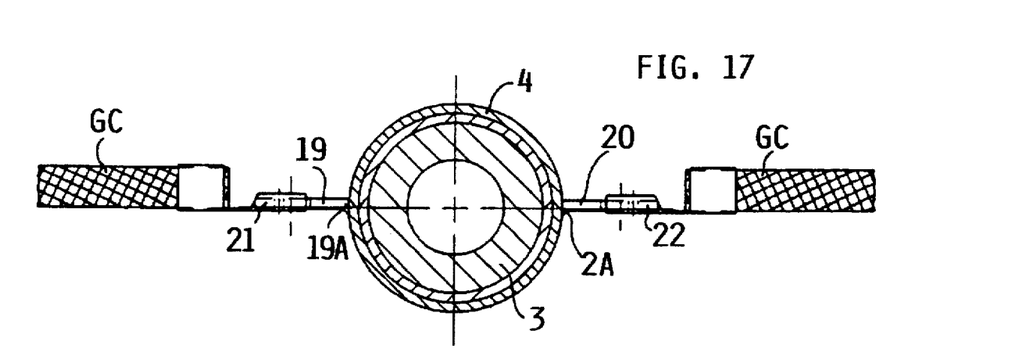
FIG. 17 is a sectional view in the direction of the section line XVII—XVII in FIG. 16.

The right-hand end of the grounding sleeve 4 has a flaring collar 4A which, according to the invention, is provided with at least one, preferably two, grounding lugs 7 and 7A which are integral or single-piece elements of the grounding sleeve 4. The lugs 7, 7A may initially extend substantially in a cylindrical plane defined by the grounding sleeve 4 and in parallel to the surface of the conducting wire mesh cable casing 5. The lugs 7, 7A are bent out into the shown position prior to use. In the use position shown in FIG. 1, an angle will be formed between the plane of the connector lug 7, 7A and the longitudinal cable axis 8 to conveniently provide access for the insertion of a screw connection through a hole 7' to secure a cable terminal of a grounding cable GC shown in FIG. 16 to the lug 7 or 7A as shown in FIGS. 16 and 17.

The flaring collar 4A is formed as a result of crimping the grounding sleeve 4 onto the casing 5 and onto the support body 3 after the casing 5 has been inserted into the sleeve 4 until the free end 5' of the casing 5 bears against an axially facing shoulder S1 in the support body 3. The formation of the collar 4A is facilitated if the crimping tool, not shown, and the inner end of the support body 3 are somewhat shorter, e.g. by a length L, than the length of the grounding sleeve 4. As mentioned and as shown in FIG. 2, the lugs 7, 7A are integrally connected to the collar 4A of the electrically conducting sleeve 4, whereby the lugs 7, 7A and the sleeve 4 form a one-piece electrical conductor. The screw connection may be accomplished either with the aid of a through-hole 7' for passing a bolt through the hole which is then tightened by a nut or by providing the hole with a threading.

The electrically conducting grounding sleeve 4 is preferably constructed of an electrically conducting metal capable of applying and maintaining the crimping action. As mentioned, the left-hand end of the sleeve 4 is either integrally connected to the support body 3 or has a form-locking location fit connection with the support body 3 while the body of the sleeve 4 itself is tightly crimped onto the electrically conducting cable casing 5 to provide an electrical connection between the elements 5, 3, and 4 and thus also with the flaring collar 4A and the grounding lugs 7, 7A. Preferably, the electrically conducting cable casing 5 forms a flexible envelope that reaches all the way to the shoulder S1 of the hollow support body 3, whereby the crimping force presses the end 5' of the grounding casing 5 onto a ring surface RS of the hollow body 3 to provide a large surface area electrical contact between the casing 5 and the ring surface RS.

The lugs 7, 7A and thus the sleeve 4 with its collar 4A are made of electrically well conducting material such as copper or aluminum. The cable casing 5, or rather the wire mesh thereof, is also made of electrically well conducting material that is simultaneously sufficiently flexible. Copper nickel alloys are suitable for this purpose. The support body 3 and the grounding sleeve 4 are preferably made of the same material such as a suitable plastically deformable metal or alloy of aluminum or copper to maintain the intended clamping or crimping force initially imposed by the crimping action of a crimping tool.

FIG. 2 further shows an electrically insulating corrugated flexible hose 10 that encloses insulated cable strands or wires 11 in the cable 1. The hose 10 is in turn surrounded by the cable grounding casing 5. The left-hand end 10' of the hose 10 bears against a further axially facing shoulder S2 of the support body 3. The crimping action holds the end 10' of the hose 10 in place through the casing 5. Preferably, the radially outer surface of the inner end of the hollow support body 3 is provided with a roughening such as serrations SS which are so oriented that the serrations SS oppose a withdrawal of the hose end 10' from the body 3. The shoulders S1 and S2 of the body 3 are axially spaced by the spacing S to form the above mentioned ring surface RS.

In FIG. 3 the same reference numbers are used as in FIGS. 1 and 2. The crimping sleeve 4 forms a tight grip around the ring surface RS around the inner body 3, thereby holding the end 5' of the grounding casing 5 firmly in place. The hose 10 is not visible in FIG. 3.

The foregoing description of the first embodiment shown in FIGS. 1, 2, and 3 applies substantially to all embodiments except for the following differences.

Figure 4:
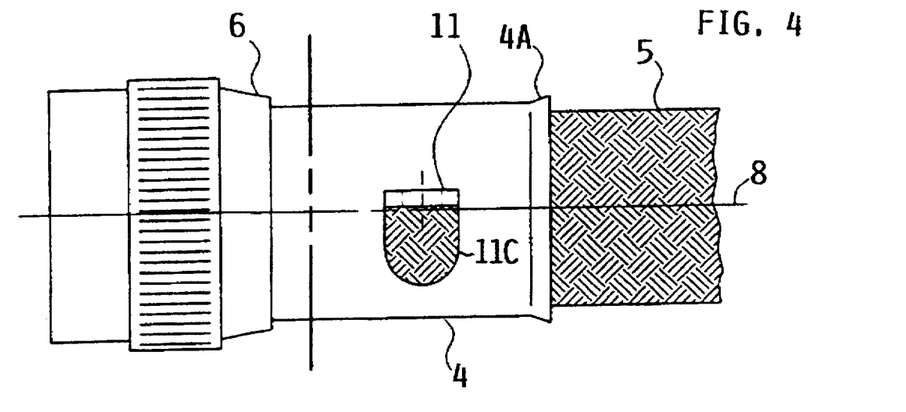
FIGS. 4, 5, and 6 show a group of Figures corresponding to FIGS. 1, 2, and 3 illustrating a modification of the grounding lug.
Figure 5:
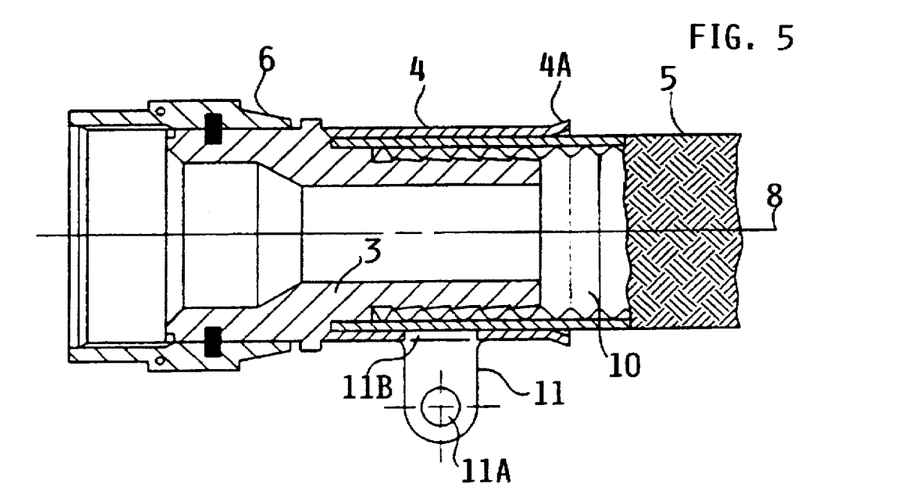
Figure 6:
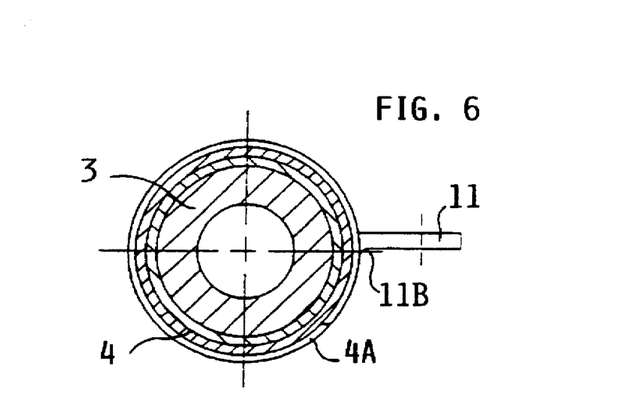

In FIGS. 4, 5, and 6 the sleeve 4 is provided with a single grounding lug 11 extending radially away from the sleeve 4 in the use position of the lug 11. Prior to using, the lug 11 is cut along line 11C out of the sleeve 4 but remains integrally and electrically connected at 11B to the grounding sleeve 4. A hole 11A in the lug 11 serves for connecting the lug to a grounding cable as described above.

Figure 7:
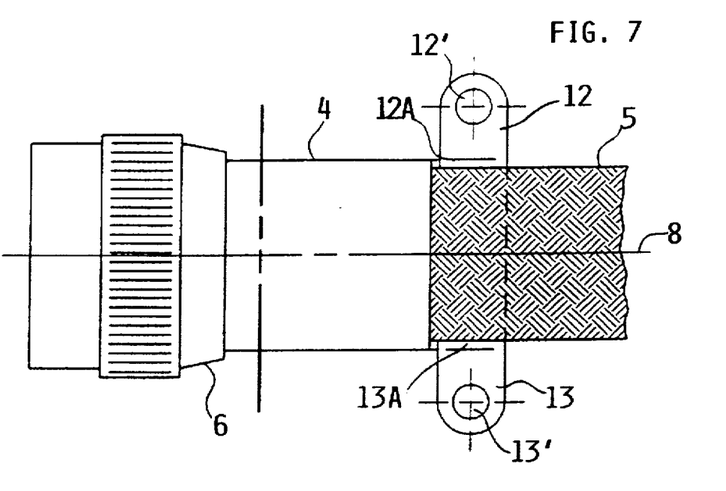
FIGS. 7, 8, and 9 show the same views as FIGS. 1, 2, and 3 respectively, however, illustrating an embodiment with two grounding lugs extending radially away from the grounding sleeve on opposite sides of the sleeve and at one end of the sleeve.
Figure 8:
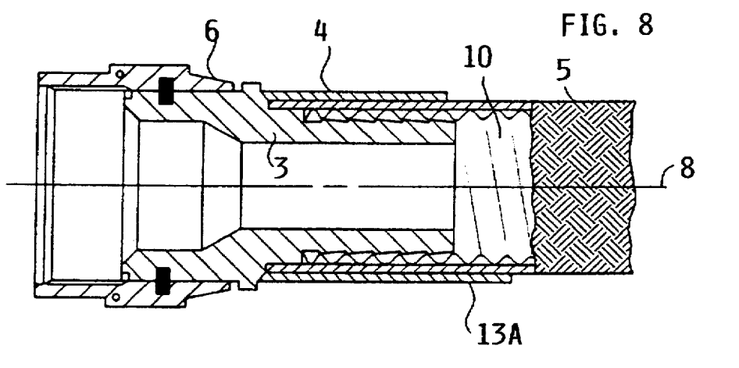
Figure 9:
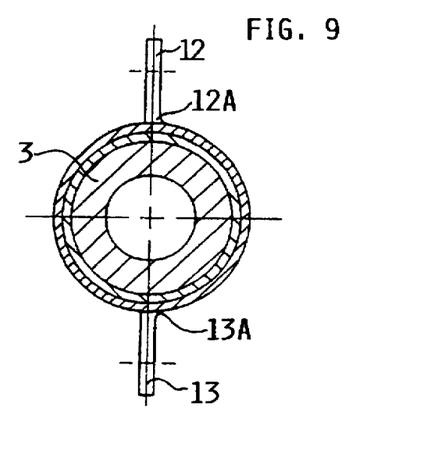

In FIGS. 7, 8, and 9 two lugs 12 and 13 are cut out of the grounding sleeve 4 but remain integrally and electrically connected at 12A and 13A. FIGS. 7 and 9 show the lugs 12 and 13 in the bend-out use position. Prior to use, these lugs may stay in the cylindrical plane defined by the sleeve 4. Connector holes permit the connection to a grounding cable as described.

Figure 10:
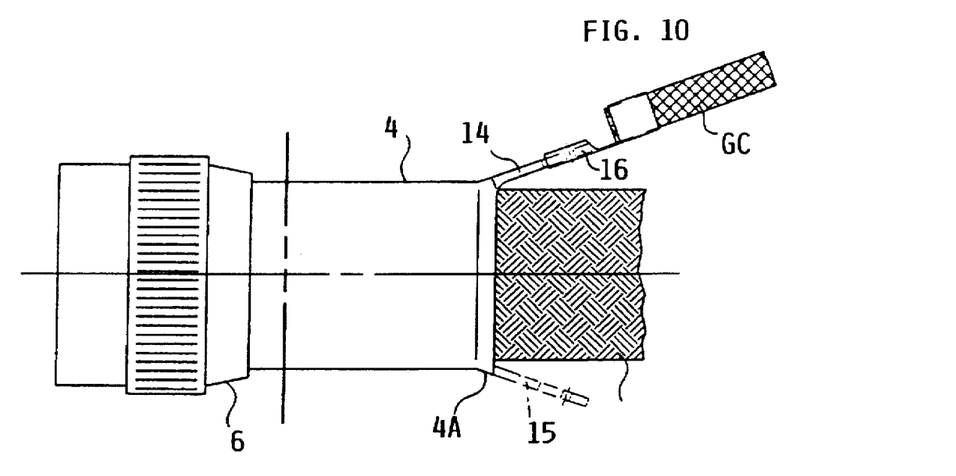
FIGS. 10, 11, and 12 show the same views as FIGS. 1, 2, and 3 respectively, however illustrating a plug-in connection of a grounding cable to the grounding lugs.
Figure 11:
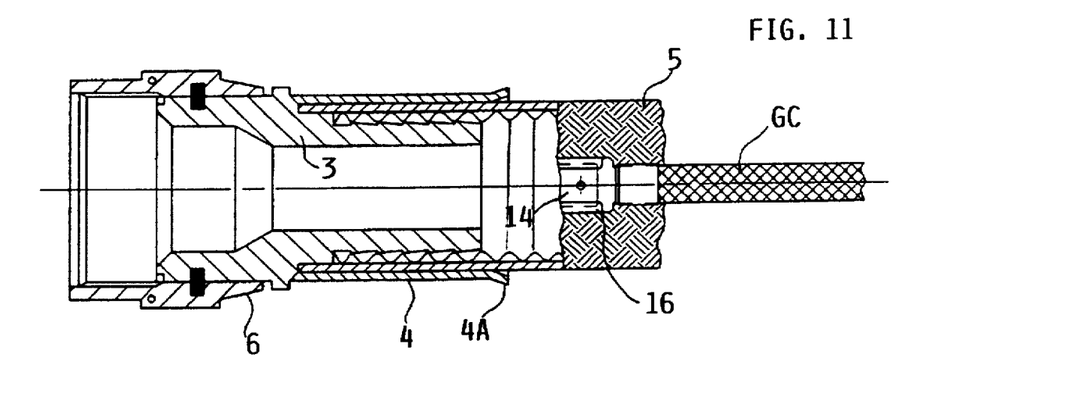
Figure 12:
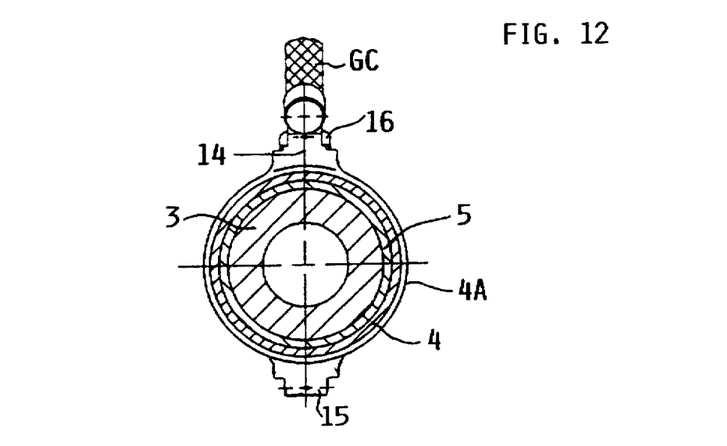

FIGS. 10, 11, and 12 show lugs 14 and 15 constructed as male plugs for cooperation with a female connector 16 of a grounding cable GC. Lug 15 is shown in dashed lines to indicate that one lug may be sufficient and the other may be optional. Lugs 14, 15 are integrally and electrically connected to the grounding sleeve 4.

Figure 13:
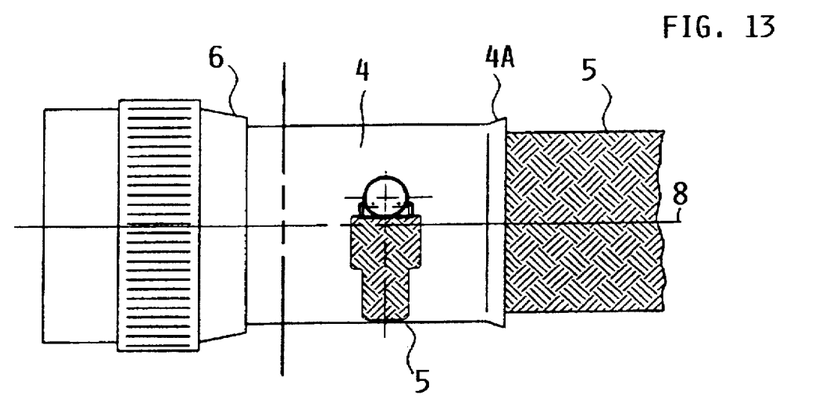
FIGS. 13, 14, and 15 show the same views as FIGS. 1, 2, and 3, respectively, illustrating a modified plug-in connection for a grounding cable.
Figure 14:
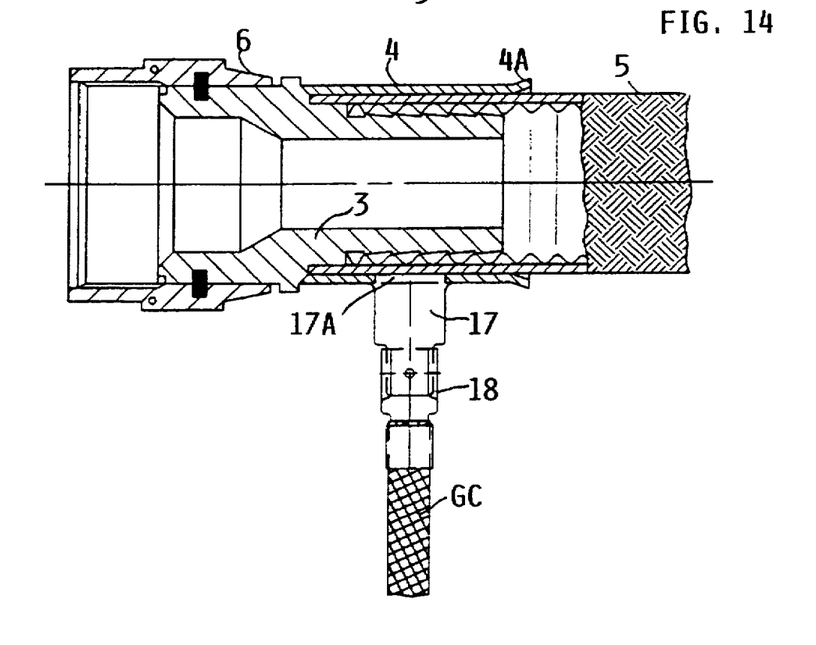
Figure 15:
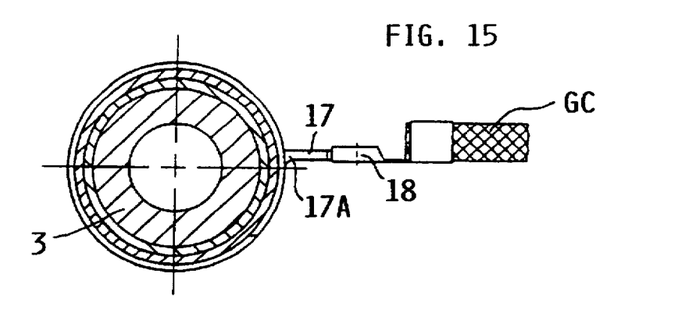

FIGS. 13, 14, and 15 show a single lug 17 cut and bent out of the sleeve 4 to extend in a radial direction. The lug 17 forms a male plug fitting snugly into a female connector 18 of the grounding cable GC. The lug 17 remains integrally and electrically connected to the sleeve 4 at 17A.

FIGS. 16 and 17 show an embodiment with grounding lugs 19 and 20 fitting as plugs into female connectors 21 and 22 of grounding cables GC. Here again the lugs are cut out of the grounding sleeve 4 but remain integrally and electrically connected thereto at 19A and 20A.

The grounding connector lugs according to the invention can be incorporated into any crimping grounding sleeves permanently connected to cables or other electrical or electronic components. The lugs are, prior to use, within the plane of the sleeve and then bent out of the sleeve configuration for using the grounding lugs. The central hollow support body 3 lends stability to the connection between the grounding sleeve 4 and the cable casing 5 and the protective hose 10 as well as to the plug-in connections. It has been found that an effective grounding is possible, and that transition resistances have been minimized due to the integral connection of the present lugs to the conducting grounding sleeves. Corrosion has also been reduced due to the integral construction which minimizes transition resistances.

Although the invention has been described with reference to specific example embodiments, it will be appreciated that it is intended to cover all modifications and equivalents within the scope of the appended claims.

What is claimed is:

1. A cable and cable connector combination comprising an electrical cable, an electrically conducting cable casing enclosing said electrical cable, a cable connector, a device for grounding said cable casing for protecting said combination against lightning, said grounding device comprising an electrically conducting grounding sleeve electrically contacting said cable casing and said cable connector for grounding said cable casing and said cable connector, and at least one grounding lug forming an integral part of said electrically conducting grounding sleeve so that said electrically conducting grounding sleeve and said grounding lug form together a one-piece electrical conductor, said grounding lug comprising means for electrically connecting a grounding conductor to said cable casing through said one-piece electrical conductor, and wherein said cable connector comprises a hollow support body of electrically conducting material arranged inside said electrically conducting grounding sleeve, said support body having a coupling end and an internal end, surrounded by said electrically conducting cable casing which in turn is surrounded by said electrically conducting grounding sleeve to clamp said electrically conducting cable casing between said support body and said electrically conducting grounding sleeve, said combination further comprising an electrically insulating protective hose enclosing said cable and surrounded by said electrically conducting cable casing formed as an electrically conducting wire mesh webbing surrounding said protective hose.

2. The combination of claim 1, further comprising a coupling nut of electrically conducting material rotatably secured to said coupling end of said hollow support body of said cable connector.

3. The combination of claim 2, wherein said coupling nut comprises a radially inwardly open groove, wherein said coupling end of said hollow support body comprises a radially outwardly open groove and an electrically conducting spring ring engaged in both of said grooves for electrically interconnecting said coupling nut and said support body and for permitting relative rotation between said coupling nut and said support body while simultaneously preventing an axial displacement between said support body and said coupling nut.

4. The combination of claim 1, wherein said electrically conducting grounding sleeve is a bushing crimped onto said electrically conducting cable casing for clamping said electrically conducting cable casing onto said electrically conducting hollow support body.

5. The combination of claim 1, wherein said electrically insulating protective hose is a corrugated hose made of flexible electrically insulating material, such as PTFE.

6. The combination of claim 5, wherein said electrically conducting grounding sleeve is a crimped bushing compressed for crimping in such a way that said protective corrugated hose and said electrically conducting cable casing are secured to said internal end of said support body.

7. The combination of claim 1, wherein both said electrically insulating protective hose and said electrically conducting cable casing bear with their ends against said hollow support body.

8. The combination of claim 7, wherein said hollow support body comprises two shoulders which are axially spaced from each other by a spacing (S) to provide between said shoulders a radially outwardly facing surface of said hollow support body for clamping of an end of said electrically conducting cable casing against said radially outwardly facing surface of said hollow support body, thereby providing electrical contact between said radially outwardly facing surface of said hollow support body and said electrically conducting cable casing.

9. The combination of claim 1, wherein said hollow support body is axially shorter than said grounding sleeve to provide support for a crimping compression where needed to prevent damage to said cable casing.

10. The combination of claim 1, wherein said cable connector is made of electrically conducting material and said electrically conducting cable casing is a wire mesh hose forming together with said cable connector a Faraday cage for shielding said combination.

11. The combination of claim 10, wherein said wire mesh hose is made of copper nickel alloy wires.

12. The combination of claim 1, wherein said hollow support body and said grounding sleeve form a single-piece, integral construction.

13. The combination of claim 1, wherein said inner end of said hollow body has an outer serrated surface.

14. A cable and cable connector combination comprising an electrical cable, an electrically conducting cable casing enclosing said electrical cable, a cable connector, a device for grounding said cable casing for protecting said combination against lightning, said grounding device comprising an electrically conducting grounding sleeve electrically contacting said cable casing and said cable connector for grounding said cable casing and said cable connector, and at least one grounding lug forming an integral part of said electrically conducting grounding sleeve so that said electrically conducting grounding sleeve and said grounding lug form together a one-piece electrical conductor, said grounding lug comprising means for electrically connecting a grounding conductor to said cable casing through said one-piece electrical conductor, and wherein said cable connector comprises a hollow support body of electrically conducting material arranged inside said electrically conducting grounding sleeve, said support body having a coupling end and an internal end, surrounded by said electrically conducting cable casing which in turn is surrounded by said electrically conducting grounding sleeve to clamp said electrically conducting cable casing between said support body and said electrically conducting grounding sleeve, wherein said cable connector is made of electrically conducting material and said electrically conducting cable casing is a wire mesh hose forming together with said cable connector a Faraday cage for shielding said combination.

* * * * *

UNITED STATES PATENT AND TRADEMARK OFFICE
CERTIFICATE OF CORRECTION

PATENT NO. : 5,631,444
DATED : May 20, 1997
INVENTOR(S) : Rook

It is certified that error appears in the above-identified patent and that said Letters Patent is hereby corrected as shown below:

```
Col. 2, line  5, replace "118,849 (Dunkel) by
                --1,118,849 (Dunkel)--.
```

Signed and Sealed this

Nineteenth Day of August, 1997

Attest:

BRUCE LEHMAN

*Attesting Officer*        *Commissioner of Patents and Trademarks*